United States Patent [19]

Song

[11] Patent Number: 4,825,310
[45] Date of Patent: Apr. 25, 1989

[54] METHOD AND APPARATUS FOR RECORDING SERVO SYNCHRONIZATION INFORMATION

[75] Inventor: Hubert Song, Sunnyvale, Calif.

[73] Assignee: Konishiroku Photo Industries Co., Ltd., Tokyo, Japan

[21] Appl. No.: 918,502

[22] Filed: Oct. 14, 1986

[51] Int. Cl.$^4$ .................... G11B 5/82; G11B 21/10
[52] U.S. Cl. .................... 360/77.08; 360/135
[58] Field of Search .................... 360/77, 78, 135

[56] References Cited

U.S. PATENT DOCUMENTS

| | | | |
|---|---|---|---|
| 4,297,737 | 10/1981 | Andresen et al. | 360/77 |
| 4,400,747 | 8/1983 | Siverling | 360/78 |
| 4,424,543 | 1/1984 | Lewis et al. | 360/77 |
| 4,462,053 | 7/1984 | Lum et al. | 360/77 |
| 4,472,750 | 9/1984 | Klumpp et al. | 360/77 |

FOREIGN PATENT DOCUMENTS 0088554  9/1983  European Pat. Off. .

*Primary Examiner*—Alan Faber
*Assistant Examiner*—David L. Robertson
*Attorney, Agent, or Firm*—Thomas E. Schatzel

[57] ABSTRACT

A servo system for flexible magnetic disks such that the synchronization pulses do not have to be perfectly aligned. The disk is encoded such that consecutive servo tracks alternate between having a synchronization and an alternate synchronization mark. Four pulses represent a synchronization mark and two pulses represent an alternate synchronization mark. The alternate synchronization marks are off-set from the synchronization marks by a certain distance, such that they do not interfere with each other when a transducer head located between the servo tracks reads them. The disk drive system will read and identify the synchronization marks or alternate synchronization marks and start generating timing signals as appropriate. The servo bursts in the servo sector can then be read.

4 Claims, 13 Drawing Sheets

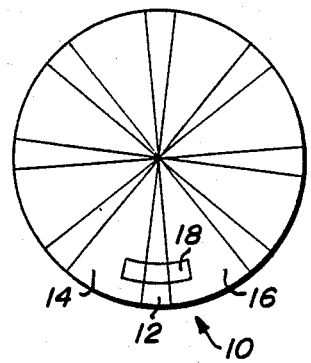
Fig_1
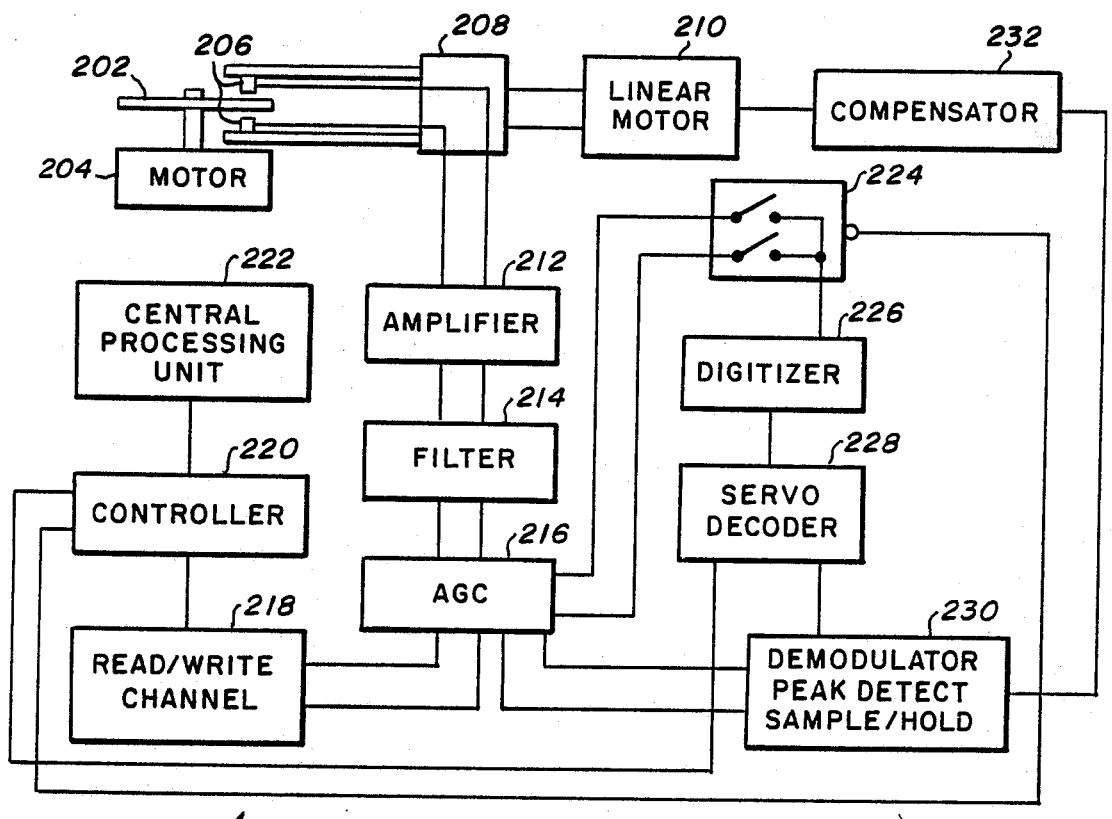
Fig_3

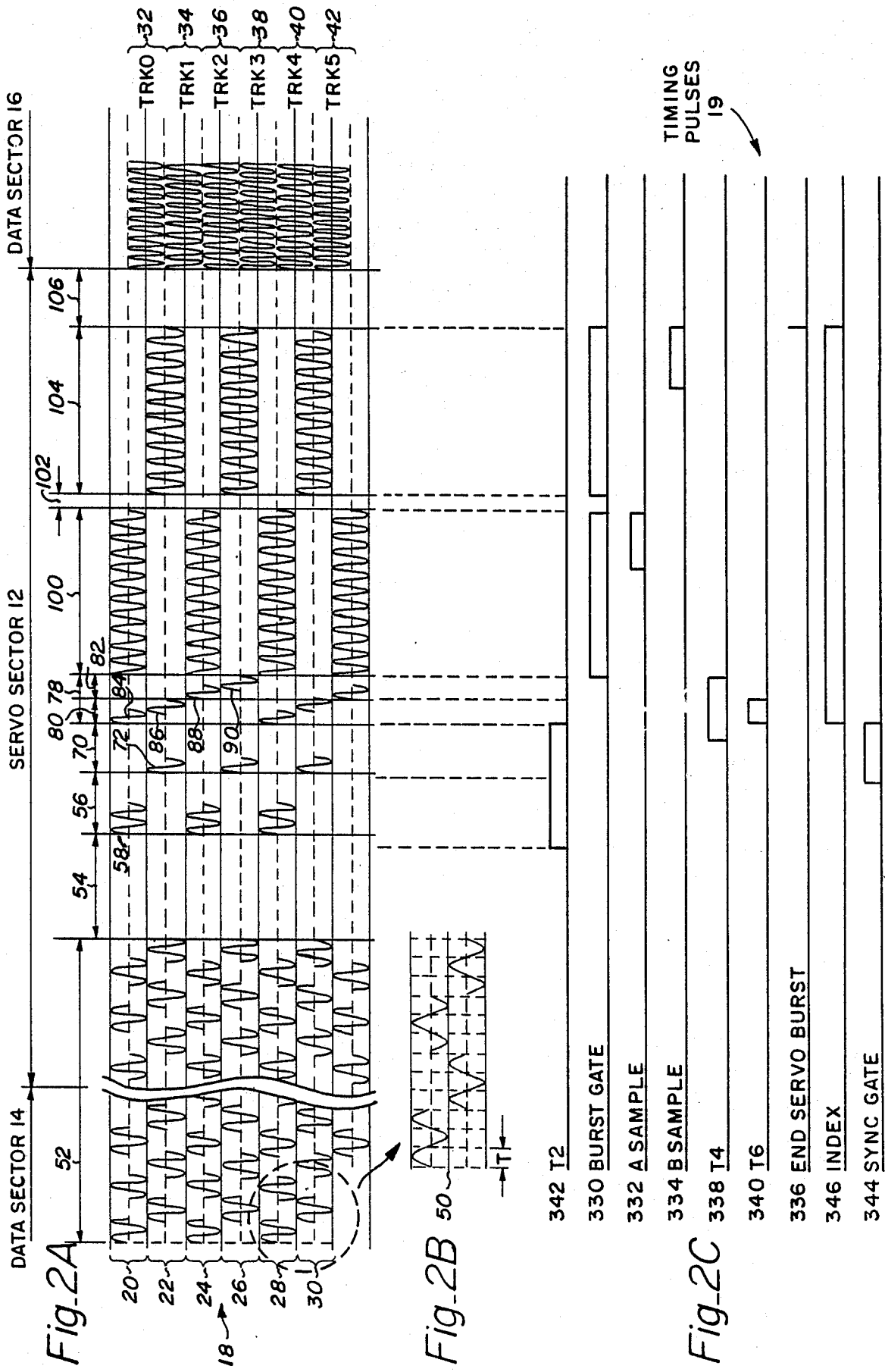

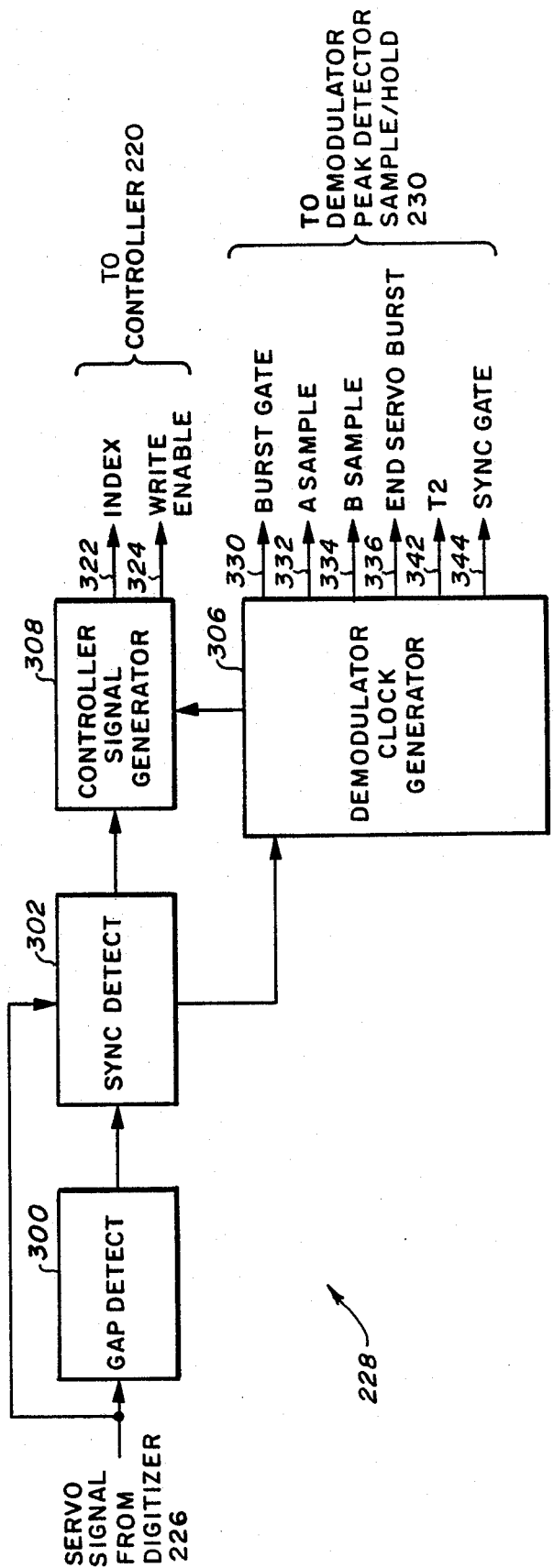
Fig_4

Fig_6

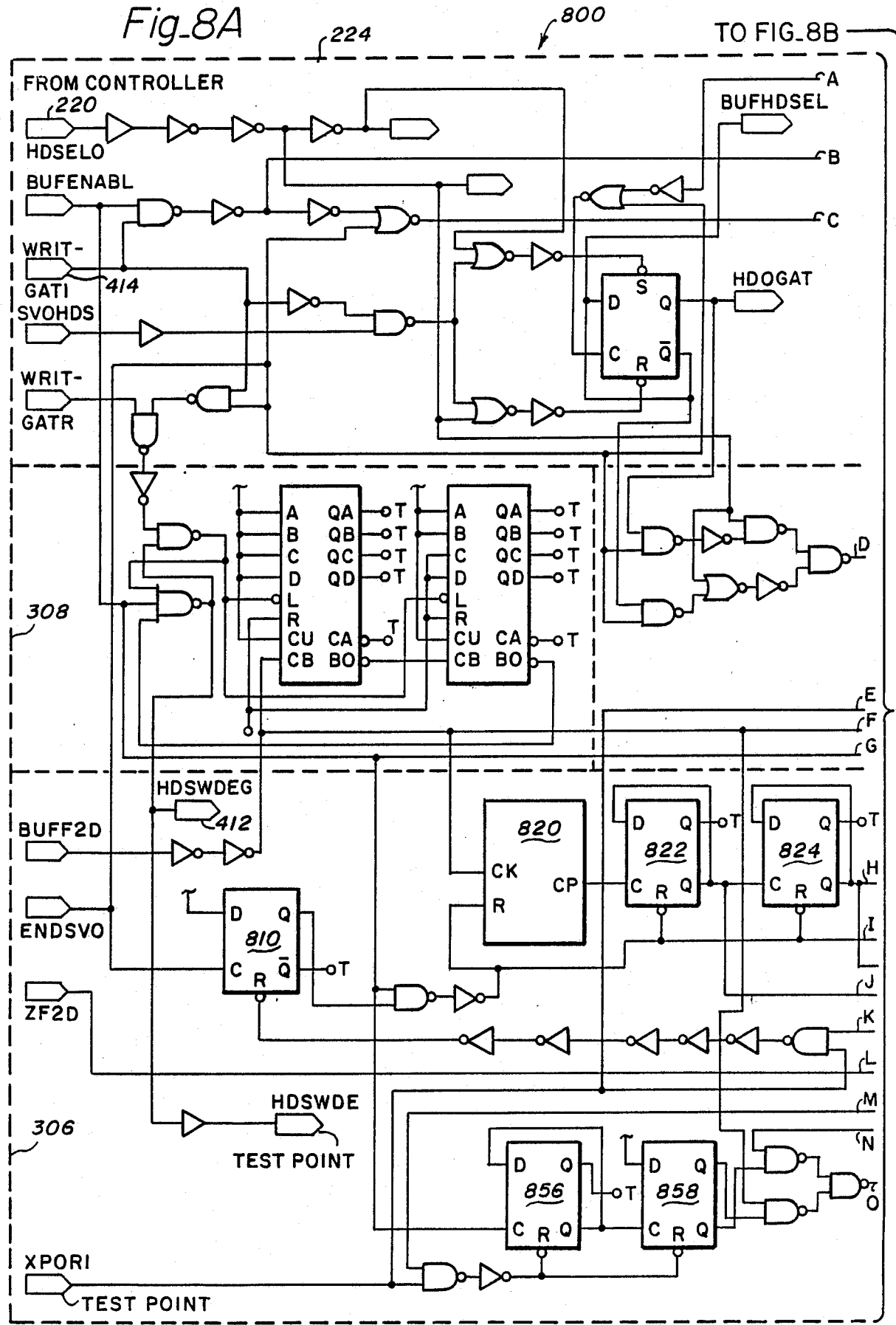
Fig_8A

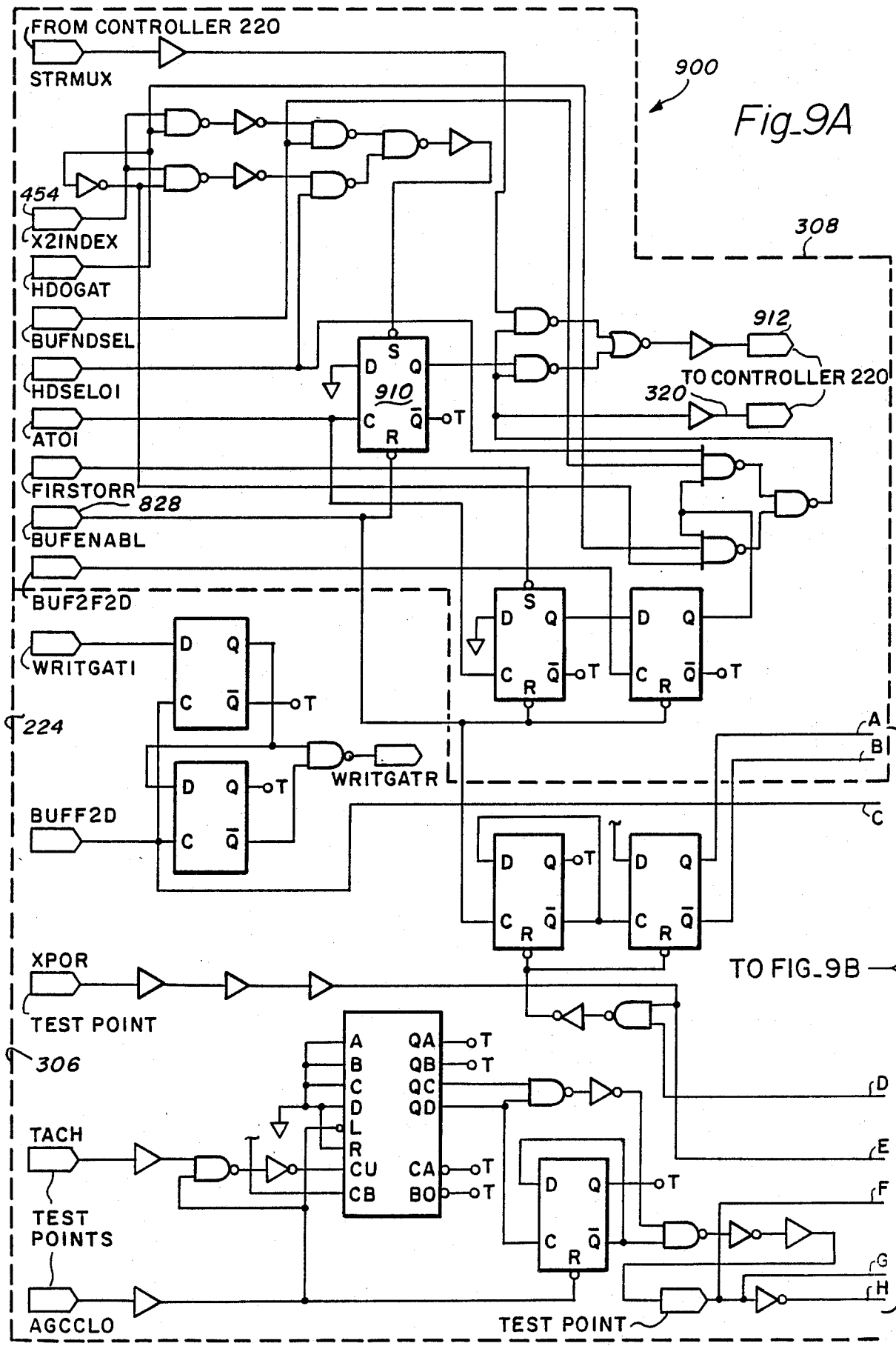
Fig_9A

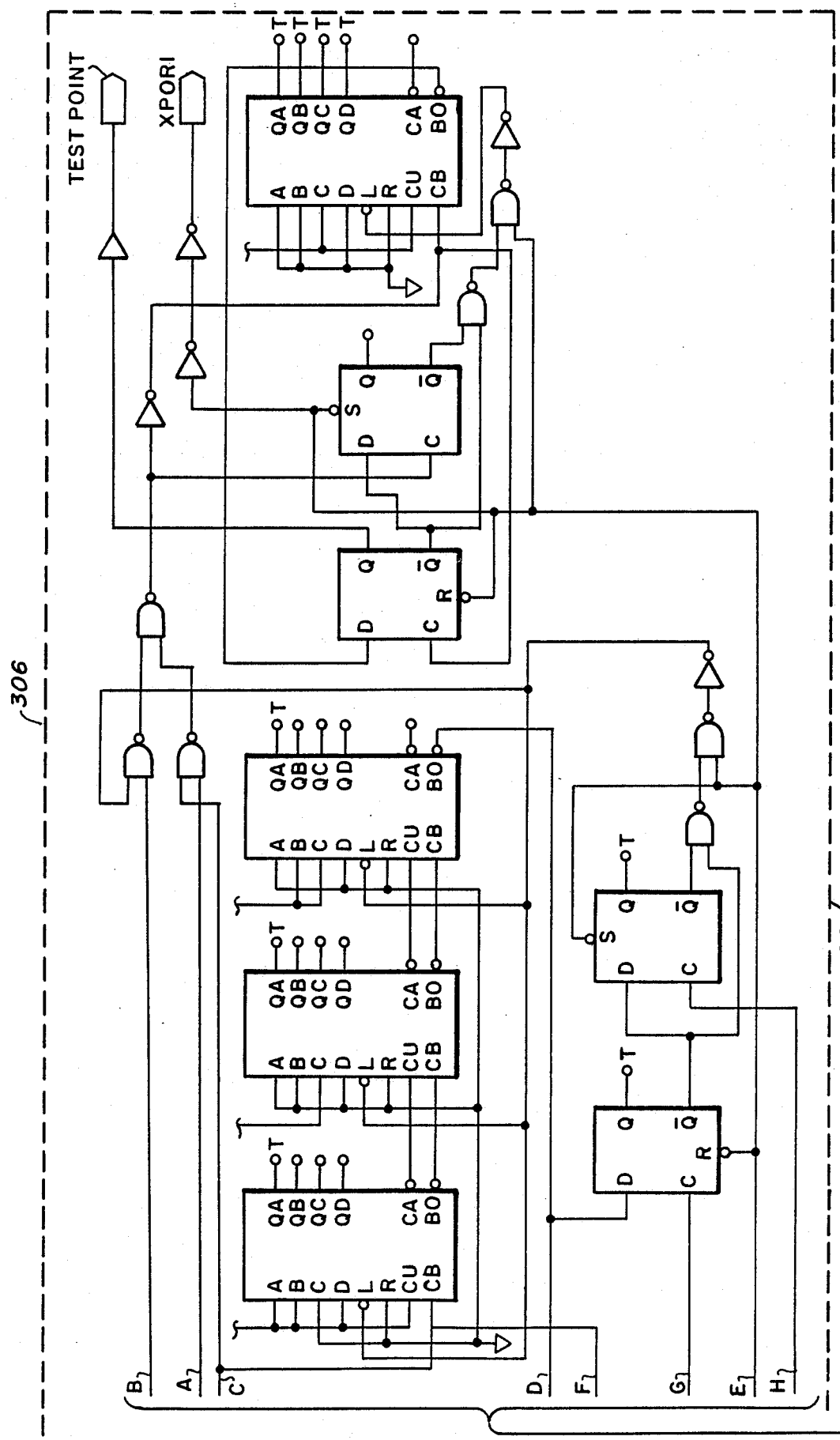
Fig_9B

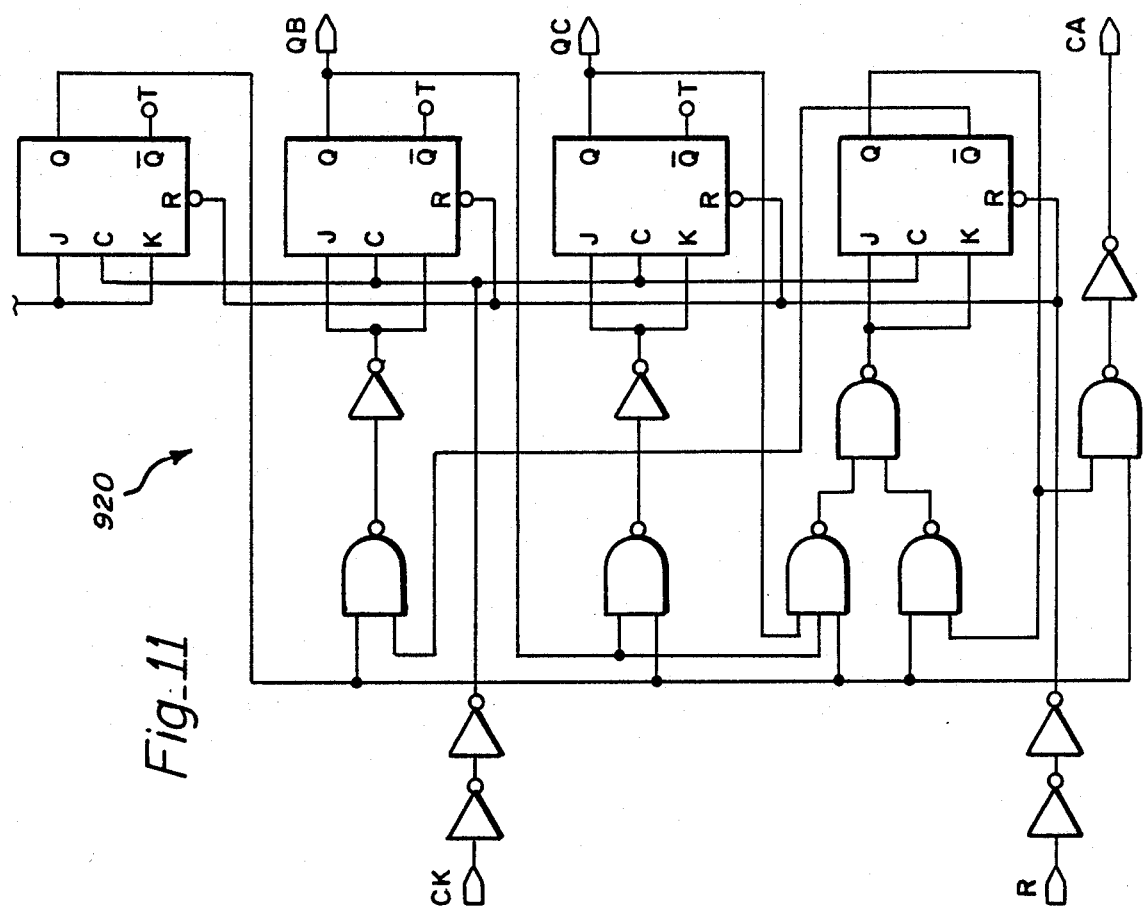
Fig_11
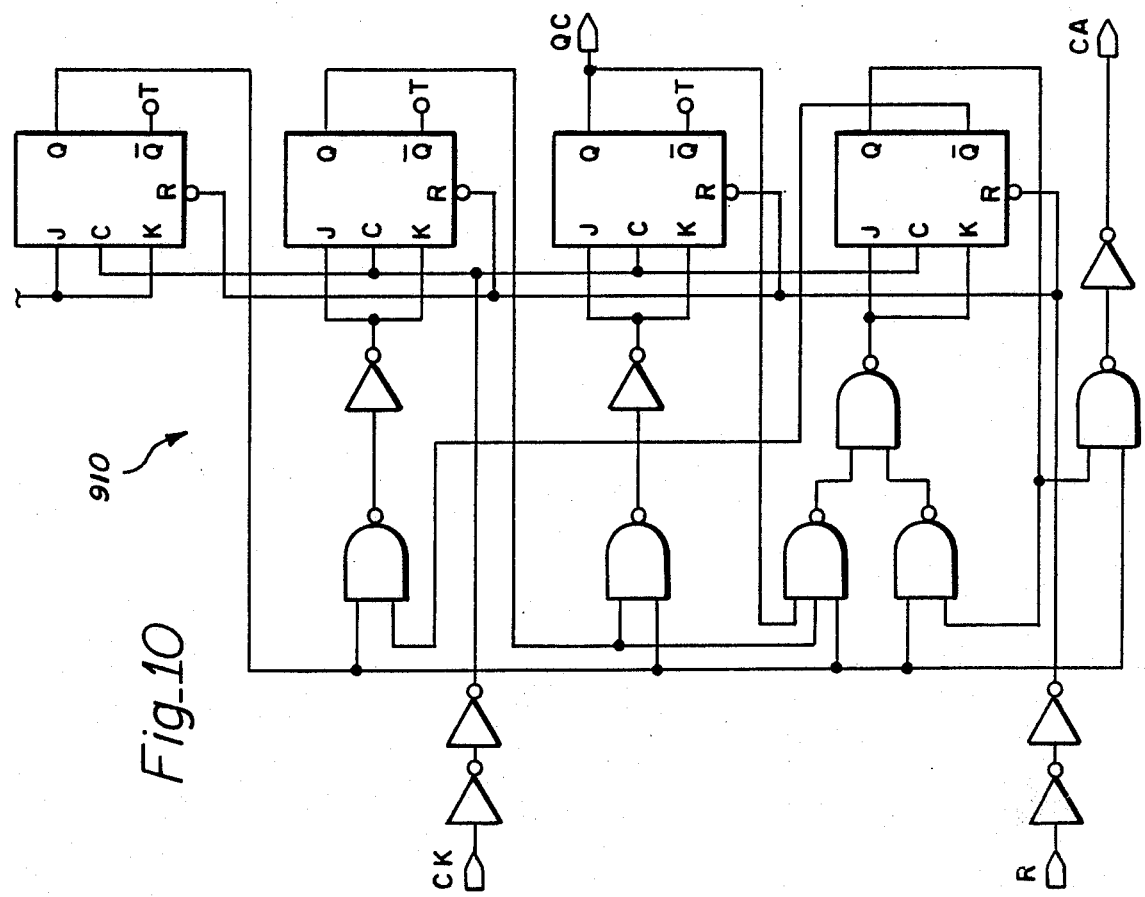
Fig_10

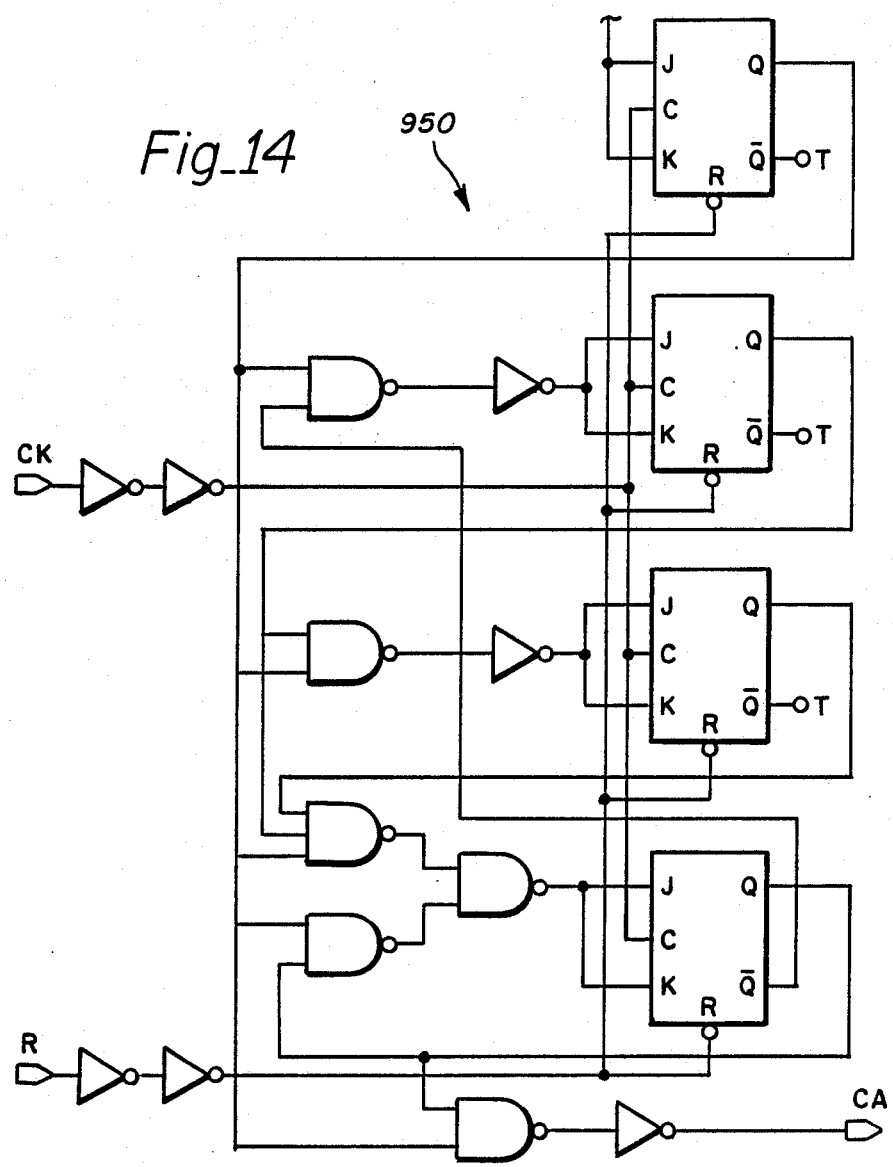
Fig_14

METHOD AND APPARATUS FOR RECORDING SERVO SYNCHRONIZATION INFORMATION

BACKGROUND OF THE INVENTION

1. Field of the Invention

This invention relates generally to data disk drive systems and more particularly to servo timing synchronization of data disks.

2. Description of the Prior Art

In electronic computer technology, it is common to store data in binary form on the face of a rotatable disk. The face of the disk is coated with a magnetizable substance such as iron oxide. The disks are operated by rotating them like phonograph records and the binary data is encoded upon, or retrieved from, the face of the disk by a movable magnetic transducer device called a read/write or transducer head. The binary information is encoded on the face of the disk in concentric rings, called tracks, and the read/write head can move radially along the disk face to select a particular track to record or retrieve information. The data disks can be rigid or flexible.

These rigid disks typically have data densities of about five hundred tracks per inch of radius of the disk. The flexible disks typically have densities of forty-eight or ninety-six tracks per inch. Because of the high density, precise positioning of the read/write head is necessary so that the head can accurately gain access to a particular desired track on the surface of the disk.

In order to obtain precise positioning, the disk drives typically have a glass scale which provides the disk drive with information on the position of the read/write head. Rigid disk systems sometimes use a different method to obtain positioning information. These rigid disks have a servo sector which is read once per revolution. The servo sector tracks contain positioning data to help the transducer head stay on the data track. The servo tracks are radially offset from the data tracks such that a transducer head passes between the servo tracks when it is positioned along a data track.

The consecutive servo tracks alternate between having an "A" burst and a "B" burst. The transducer head reads the "A" and "B" bursts from the servo tracks on either side. The intensities of the "A" and "B" bursts are measured and the head is adjusted to keep the head mid-way between the servo tracks and directly on the data track.

In order for the head to read the servo bursts, the disk drive system must know when to look for them. In order to do this, rigid disks have synchronization marks at the beginning of each servo track. When the head reads a synchronization mark, the disk drive system can generate timing pulse windows to look for the servo bursts. The transducer head reads the two servo tracks on either side of it at the same time. The magnetic pulses which comprise the synchronization marks on the consecutive servo tracks must line-up perfectly or they will cancel each other out and the disk drive system will not be able to recognize them as the synchronization marks which signify the beginning of a servo sector.

In rigid disk systems, alignment of the synchronization marks is not a problem. Rigid disks typically have clocking information located on one surface of the disk. The clocking information is read from one side of the disk as the servo tracks are being written on the other side of the disk. Exact alignment of the sync marks during encoding of the disk is thus possible.

Flexible disk systems have heretofore not used servo sectors for positioning. The flexible disks have problems with encoding the synchronization marks because one side of the disk cannot be read at the same time that the other side of the disk is being encoded. The thin surface of the flexible disk allows cross-talk between the heads on either side. The flexible disks can use an optical encoder at the end of the spindle shaft to provide clocking information during the encoding process. However, the disks cannot be efficiently encoded with perfect alignment of the synchronization marks due to the flexiblity of the disk.

SUMMARY OF THE INVENTION

It is an object of the present invention to provide a method for servo synchronization for flexible disks.

It is another object of the present invention to provide a flexible magnetic disk upon which the synchronization marks do not have to be perfectly aligned.

Briefly, in a preferred embodiment, the present invention provides a data disk which has consecutive servo tracks which alternate between having a synchronization and an alternate synchronization mark. Four magnetic pulses represent a synchronization mark and two magnetic pulses represent an alternate synchronization mark. The alternate synchronization marks are off-set from the synchronization marks by a certain distance, such that they do not interfere with each other when a transducer head located between the servo tracks reads them. The disk drive system will read and identify the synchronization marks or alternate synchronization marks and start generating timing pulses as appropriate. The servo bursts can then be read.

It is an advantage of the present invention in that it provides a servo synchronization method for flexible disks.

It is a further advantage of the present invention in that it provides a flexible magnetic disk upon which the synchronization marks do not have to be perfectly aligned.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a diagrammatic illustration of a magnetic disk sectored according to the present invention;

FIG. 2A is a diagram of recordings of a portion of the disk shown in FIG. 1;

FIG. 2B is a diagram of recordings of a portion of the disk shown in FIG. 1;

FIG. 2C is a diagram of timing pulses generated from recordings of a portion of the disk shown in FIG. 1;

FIG. 3 is a block diagram of a data disk drive system of the present invention;

FIG. 4 is a block circuit diagram of the servo decoder of the system shown in FIG. 3.

FIGS. 8A and 8B are a circuit diagram of part of the servo decoder of FIG. 4;

FIGS. 9A and 9B are a circuit diagram of part of the servo decoder of FIG. 4;

FIG. 10 is a circuit diagram of part of the servo decoder of FIG. 4;

FIG. 11 is a circuit diagram of part of the servo decoder of FIG. 4;

FIG. 14 is a circuit diagram of part of the servo decoder of FIG. 4.

DETAILED DESCRIPTION OF THE PREFERRED EMBODIMENT

Figure 5:
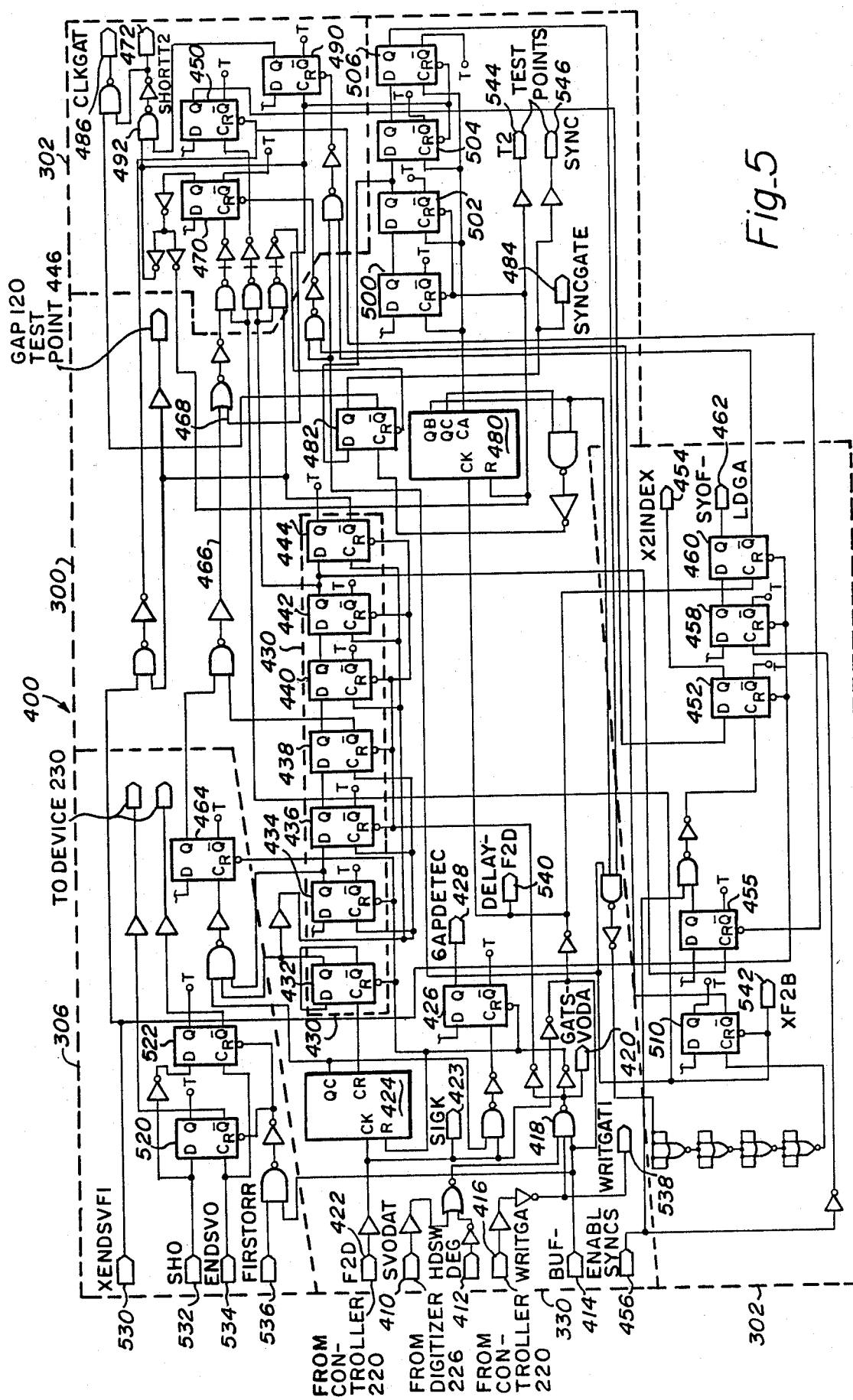
FIG. 5 is a circuit diagram of part of the servo decoder of FIG. 4.

FIG. 1 shows a flexible magnetic disk of the present invention and is designated by the general reference number 10. The disk 10 is divided into data sectors and servo sectors with a servo sector 12 located between a data sector 14 and a data sector 16. A portion of the disk 10 is referred to by the general reference number 18. Portion 18 overlaps the servo sector 12 and data sectors 14 and 16.

FIG. 2A shows a schematic of recordings of the sectors 12, 14 and 16 within the portion 18 of disk 10 and FIG. 2C also shows a plurality of corresponding timing pulses 19. Recordings on the disk portion 18 is divided into a plurality of servo tracks 20, 22, 24, 26, 28 and 30, and a plurality of data tracks 32, 34, 36, 38, 40 and 42. The servo tracks 20-30 are radially off-set from the data tracks 32-42 such that each data track lies halfway between two servo tracks.

The disk 10 is encoded with information in the form of magnetic pulses which are represented by waveforms. To better illustrate such, FIG. 2B is a magnified portion 50 of pulses of the data sector 14. Each magnetic pulse has a width of "T". "T" is a distance which corresponds to the distance a transducer head passes over the disk in 886 nanoseconds when the disk rotates at six hundred rpm.

Within portion 18 are recordings of a speed buffer section 52 which overlaps data sector 14 and servo sector 12. The speed buffer section 52 recordings comprises numerous pulses representing "zeros". The speed buffer section 52 is located at the end of data sector 14. Thus, when the data sector 14 is written upon, the end of the written data will overlap into the speed buffer section 52. Due to slight variation in the rotation speed of the disk 10, the data recordings will not always exactly end at the end of data sector 14. The speed buffer section 52 ensures that there will not be any gaps in the data sector 14 which could be confused with servo gaps.

The servo sector 12 begins in the speed buffer section 52. The servo sector 12 has a servo gap 54 which follows the speed buffer 52. The servo gap 54 does not contain any magnetic pulses so that when a transducer head reads the gap, the disk drive system detects the gap and thus knows that it has reached the servo sector 12 and must look for the synchronization (sync) and alternate synchronization (alternate sync) marks.

A synchronization section 56 follows the servo gap 54. The synchronization section 56 may or may not have a sync mark 58. Consecutive servo tracks alternate between having and not having sync marks 58 and as illustrated, servo tracks 20, 24 and 28 have sync marks 58 and servo tracks 22, 26 and 30 do not. The sync marks 58 are typical of all sync marks and comprise four magnetic pulses.

An alternate synchronization section 70 follows the synchronization section 56. If the servo track does not have a sync mark 58 in the synchronization section 56 then it will have an alternate sync mark 72 in the alternate synchronization section 70. The servo tracks 22, 26 and 30 are illustrated as having alternate sync marks 72. The alternate sync marks 72 are typical alternate sync marks comprised of two magnetic pulses.

In operation, a transducer head is positioned along a data track, such as track 32, between two servo tracks such as 20 and 22. The servo gap 54 is read by the head. The gap 54 is usually fourteen "T"s long. However, the servo gap 54 is thirty-seven "T"s long on one servo sector of the disk. This longer servo gap 54 identifies an index sector or starting point for data writing. After the head detects servo gap 54, the disk drive system looks for either a sync mark or an alternate sync mark. If it reads four pulses, then it knows that it has read a sync mark 58 and the timing windows can be generated using this point as a reference. If two pulses are detected, then the disk drive system knows that an alternate sync mark 72 has been detected and it generates timing windows from that point taking into account the distance between the sync marks 58 and alternate sync marks 72. If the head is off of the data track, e.g. track 32 a great amount, then only one of the servo sector tracks may be read. However, the timing windows can still be generated based on either a sync mark 58 or alternate sync mark 72 alone.

The prior art used synchronization marks on consecutive servo tracks. If the synchronization marks were not perfectly aligned, they would interfere and cancel each other out when the transducer head read them as it passed between two of the servo tracks. The present invention overcomes this problem by using synchronization marks 58 on alternate servo tracks. The present invention adds the distinctively different alternate synchronization marks 72 on alternate tracks. The synchronization and alternate synchronization marks are off-set so that they will never interfere with each other when the head reads them. At the same time, even if the head is off of the data track by a large amount and can only read one of the servo tracks, the disk drive system will still be able to identify its position and generate the appropriate timing signals.

The timing signals generated by the data disk drive system allow the system to know when to look for the information contained in the remainder of the servo sector 12. A code beat section 78 follows the alternate synchronization section 70. The code beat section 78 is divided into a subsection 80 and a subsection 82. A code beat mark 84 is typical of all code beat marks and is comprised of two magnetic pulses. Code beat mark 84 is shown in a first position of subsection 80. Each code beat section contains one code beat mark. The code beat mark is located in one of two positions of the subsection 80 or one of two positions in the second subsection 82. As shown in FIG. 2A, the location of the code beat mark is shifted one position with each consecutive servo track. Thus, servo track 22 has a code beat mark 86 in the second position of subsection 80; servo track 24 has a code beat mark 88 in a first position of subsection 82; and servo track 26 has a code beat mark 90 in a second position of subsection 82.

In operation, the disk drive system uses the timing windows generated from the synchronization sections 56 and alternate synchronization sections 70 to set-up the section 80 and section 82 of code beat section 78. The head reads between two servo tracks, so two code beat marks are read during one pass through the code beat section 78. If two code beat marks are both detected in either the subsection 80 or subsection 82, then the disk system knows that the data track is an even numbered track. If one code beat mark is detected in the subsection 80 and one code beat mark is detected in the subsection 82, then the system knows that the data track is an odd numbered track.

An "A" servo burst section 100 follows the code beat section 78. A servo burst gap 102 follows the "A" servo burst section 100. A "B" servo burst section 104 follows the servo burst gap 102. Finally, a transition gap 106 follows the "B" servo burst section 104. The consecutive servo tracks alternate between having an "A" burst in section 100 and having a "B" burst in section 104. The servo bursts are comprised of multiple magnetic pulses.

In operation, the timing windows generated from the synchronization and alternate synchronization sections 56 and 70, are used to set-up the timing windows for the sections 100 and 104. The head passes between two servo tracks and reads an "A" burst from one servo track and a "B" burst from the other servo track. The disk drive system measures the intensity of each burst. If the "A" burst measures greater than the "B" burst, then the system moves the head closer to the "B" burst servo track. If the "B" burst is greater than the "A" burst, then the system moves the head closer to the "A" burst servo track. The system thus keeps the head on the data track mid-way between the servo tracks. After the head reads the servo bursts, the head passes a transition gap 106. The head can be switched from a read to a write mode during the gap 106. The head is then ready to begin writing on the data tracks in data sector 16.

FIG. 3 shows a block diagram of a data disk drive system of the present invention and is designated by the general reference number 200. A flexible magnetic disk 202 is rotated by a motor 204. Magnetic heads 206 are attached to a carriage 208 which is driven by a linear motor 210. As the disk 202 rotates, the heads 206 read the information on the disk 202. The output signals from heads 206 are sent through amplifier 212, filter 214 and automatic gain control 216. The signal is then sent to a read/write channel 218. The read/write channel 218 separates the signals read from the data sectors 16 into a clock signal and a data signal which in turn are sent to a controller 220. The controller 220 is connected to a central processing unit 222.

The signals from automatic gain control 216 are also sent to a head switch control 224. The head switch control 224 controls the passage of the signal to a digitizer 226. Controller 220 is connected and controls the head switch control 224 which in turn is connected to a digitizer 226 which digitizes the signal and sends it to a servo decoder 228 which is connected to a demodulator, peak detect, sample/hold circuit 230 and controller 220. The servo decoder 228 detects the servo gap 54, the sync marks synchronization section 56 and alternate sync marks 70 of alternate synchronization section 70, and generates the appropriate timing pulses or windows. These timing signals are sent to the demodulator, peak detector, and sample/hold device 230. Device 230 uses the timing pulses from decoder 228 to read the servo information such as the "A" and "B" servo bursts of sections 100 and 104. The device 230 then calculates and sends a position error signal to a compensator 232 which in turn is connected to the linear motor 210. Compensator 232 controls linear motor 210 to move heads 206 to keep the heads on track.

FIG. 4 shows a circuit diagram of the servo decoder 228. The decoder 228 includes a gap detect circuit 300 and the servo signal from the digitizer 226 is passed to the gap detect circuit 300. The gap detect circuit 300 is connected to a sync detect circuit 302, a demodulator clock generator 306, and a controller signal generator 308. When the gap detect 300 detects the servo gap 54, it sends a timing pulse "T2" and a "sync gate" pulse to the sync detect circuit 302. The "T2" and "sync gate" signals set the timing windows for reading the sync and alternate sync sections 56 and 70. The sync detect 302 detects if the servo gap is an index sector, and if it is, the sync detect 302 sends an index signal to the controller signal generator 308. The servo signal is passed to the sync detect circuit 302. The demodulator clock generator 306 sends an end servo burst signal to the controller signal generator 308 when the end of the servo section is reached.

The sync detect circuit 302 detects the sync marks 56 or alternate sync marks 70 and sends a start signal to demodulator clock generator 306. The amount of time delay in sending the synchronization signal depends upon whether a sync mark 58 or alternate sync mark 70 was detected.

The controller signal generator 308 generates signals for the controller 220. An index signal 322 signifies that the index sector is being read. A write enable signal 324 prevents the write mode from being used during the time the head is reading a servo sector 12.

The demodulator clock generator 306 generates timing signals for the demodulator, peak detector, and sample/hold device 230. A burst gate 330 sets the timing window for reading the servo bursts "A" and "B". An "A" sample 332 sets the timing for reading the "A" servo burst. A "B" sample 334 sets the timing for reading the "B" servo burst. An end servo burst pulse 336 signifies the end of the servo sector 12. A "T4" pulse 338 sets the timing window for reading the code beat section 78. A "T6" pulse 340 sets the timing window for dividing the code beat section 78 into a first section 80 and a second section 82. Both "T4" and "T6" are generated internally in the demodulator clock generator 306. Using the code beat timing windows, the demodulation clock generator 306 determines whether the track is even or odd and outputs either an even or odd track signal, respectively. A "T2" signal 342 sets the timing window for reading the sync and alternate sync sections 56 and 70. A sync gate signal 344 sets the timing window for dividing the sync section 56 from the alternate sync section 70. An index signal 346 signifies that an index sector is being read. See FIG. 2C for the relationship of the timing pulses relative to the servo sector.

FIG. 5 shows a circuit diagram of part of the servo decoder 228 and is designated by the general reference number 400. Part 400 contains parts of the gap detect 300 and sync detect 302. Gap detect 300 receives signals from the digitizer 226 at a point 410. The signals at a point 410 are known as servo data signals (SVODAT). The SVODAT signals are gated with signals from a point 412. The signals at point 412 originate in circuits shown in FIG. 8. Point 412 is part of a head switching feature which is not a part of the present invention and the circuits concerning the head switching feature are not needed to practice the present invention. For purposes of the present description, the circuits concerning the head switching feature are considered to be inactive.

A point 414 receives a BUFFNABL signal from the controller 220 when the controller 220 wants to disable the decoder.

A point 416 receives a WRITGA signal from the controller 220 to disable the decoder 228 when the disk drive system 200 is writing on a data section. The SVODAT signal from point 410 is connected to a gate 418. Depending upon the WRITGA and BUFFNABL signals, the SVODAT signal passes gate 418 and reaches a point 420. The gated servo data (GATSVODA) signal at point 420 goes to FIG. 6 for use by the sync detect 302.

A point 422 receives a F2D signal from controller 220. F2D signal is a constant 3.225 megahertz crystal frequency signal. The F2D signal is passed to a point 423 and is known as a SIGK signal. A decade counter 424 starts counting as soon as the SVODAT signal goes low, indicating the presence of a gap. When four clock or timing pulses from the crystal frequency F2D are counted, the counter 424 clocks a latch 426 and a gap detect (GAPDETEC) signal is sent to a point 428. The gap detect signals are used by the sync detect 302 in FIG. 6.

A shift register 430 is connected to counter 424 and is used to detect gaps in the servo data greater than four timing pulses. Shift register 430 is comprised of a plurality of latches 432, 434, 436, 438, 440, 442 and 444. Counter 424 counts ten timing pulses and then clocks latch 432. Latch 432 divides the signal from counter 424 by two. The output of latch 432 is used to clock the rest of the latches in the shift register 430. Each latch counts twenty timing pulses. Latch 434 counts twenty, latch 436 counts forty, latch 438 counts sixty, latch 440 counts eighty, latch 442 counts one hundred, and latch 444 counts one hundred and twenty. As long as a gap is detected in the SVODAT signal, then the shift register 430 keeps shifting from latch to latch. A test point 446 known as gap 120 receives a signal after one hundred and twenty timing pulses.

When shift register 430 reaches one hundred timing pulse counts, it indicates that an index sector is being read, and a latch 450 is then clocked. The output of latch 450 enables a latch 452 which in turn puts out an X2 INDEX signal at a point 454 which is used by the circuits in FIG. 9. Latch 452 is clocked by a latch 455. When a sync or alternate sync signal is detected in sync detect 302, a syncs signal is provided at a point 456 from the portion of the sync detect 302 shown in FIG. 6. The syncs signal clocks a latch 458 which in turn enables a latch 460. Latch 460 provides a one clock delay before a SVOFLDGA signal is sent to a point 462. The SVOFLDGA signal is used to start the demodulator clock generator 306.

"T2" is the window for detecting sync marks. Two different "T2" windows are generated depending on whether a regular sector or an index sector is being read. A latch 464 is clocked after a gap is detected and the first "T2" signal is sent along a line 466. If an index gap is detected, a second "T2" signal is sent from latch 444 along line 468. Both "T2" signals are gated and clock a latch 470. Latch 470 delivers a short "T2" signal to a point 472. The short "T2" signal is the actual "T2" signal used by the sync detect 302.

The trailing edge of the "T2" window is set by a decade counter 480. Counter 480 determines how long "T2" is active. When "T2" becomes active, counter 480 starts counting and thirteen nanoseconds later clocks a latch 482. Latch 482 sends a sync gate signal to a point 484. Sync gate signal is used by the sync detector 302 in FIG. 6 to divide "T2" into two windows for detecting the sync and alternate sync marks. Latch 482 sends an inverse signal to a point 484 called a clock gate (CLKGAT) which is also used by the sync detect 302.

A latch 490 is latched by latch 460 if a sync or alternate sync is detected. Latch 490 then sends a signal to a gate 492 which shuts off the short "T2" signal.

A plurality of latches 500, 502, 504 and 506 form a reset delay network for the "T2" signal which is connected to counter 480. Counter 480 clocks latches 500, 502, 504 and 506. Latch 506 then clocks a latch 510. Latch 510 then resets latch 470. A latch 520 and a latch 522 are used in the head selection feature.

Figure 6:
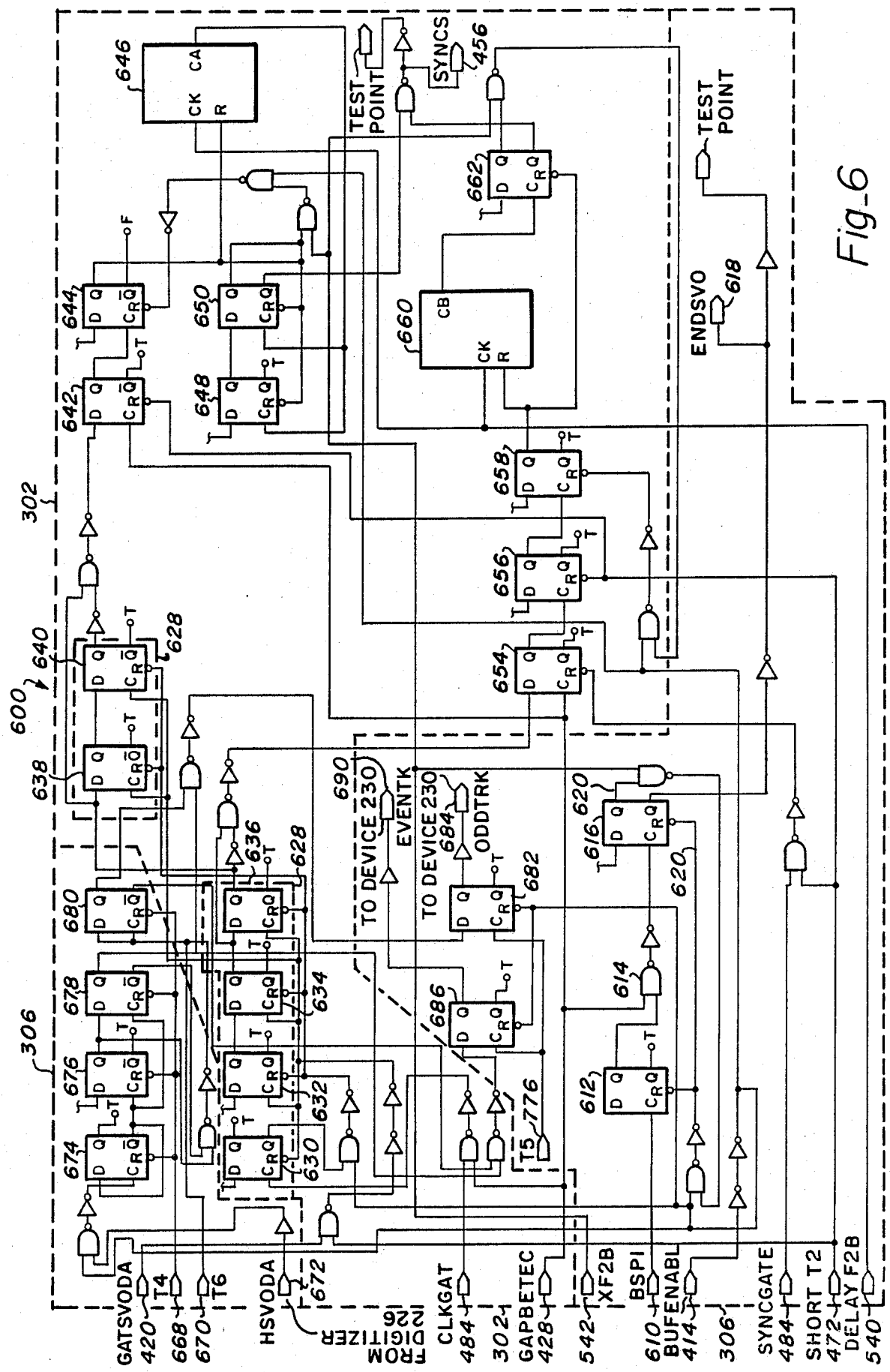
FIG. 6 is a circuit diagram of part of the servo decoder of FIG. 4.
Figure 7:
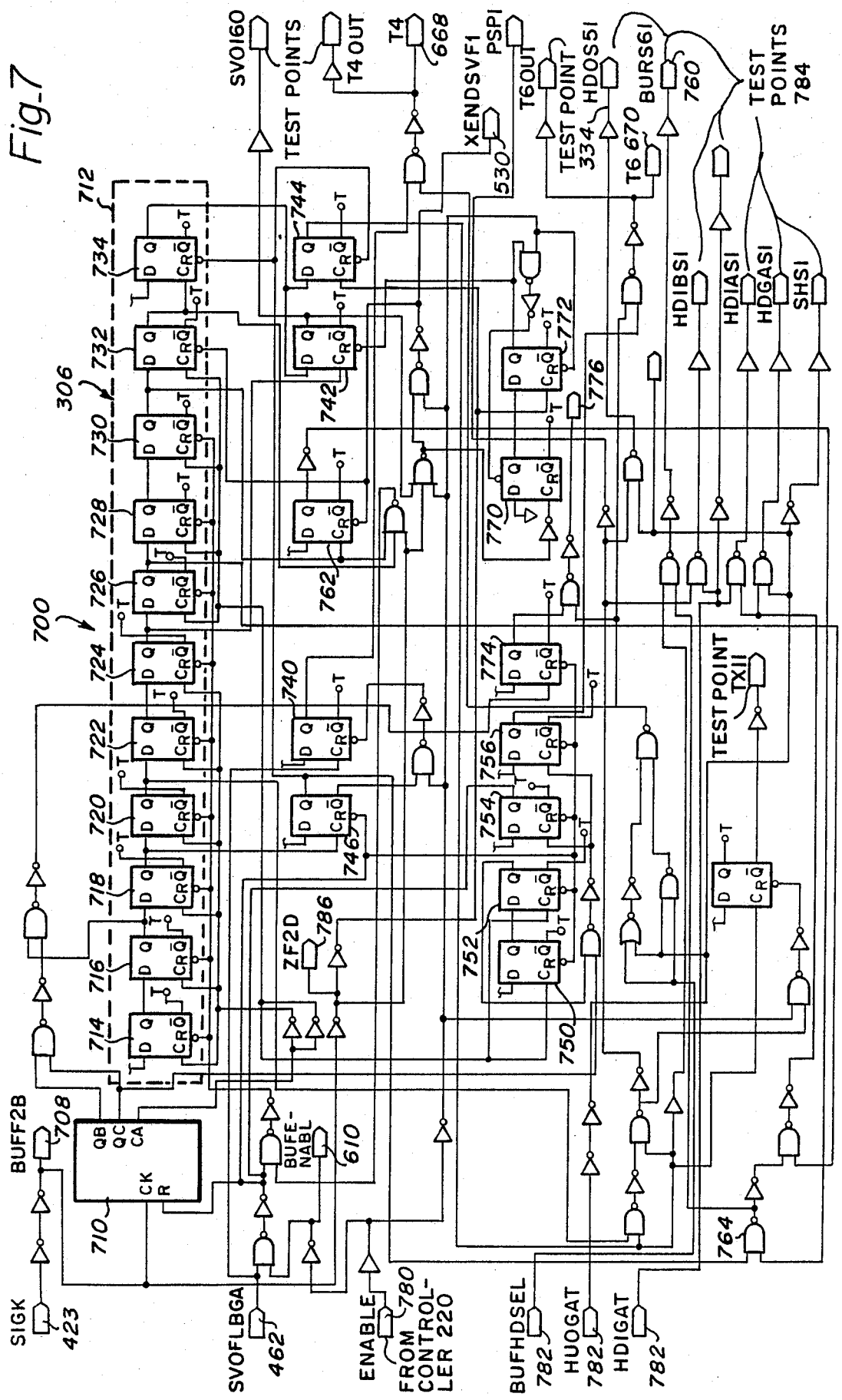
FIG. 7 is a circuit diagram of part of the servo decoder of FIG. 4.

A point 530 receives an end demodulation clock generator signal (XENDSVFI) from the demodulator clock generator 306 of FIG. 7. This signal resets the index latches 450, 452, 455, 458 and 460. A point 532 receives a SHO signal which is related to the head switching feature. A point 534 receives an end servo burst signal (ENDSVO) from the circuits of FIG. 6. A point 536 receives a first order signal (FIRSTORR) from the circuits of FIG. 8. The first order signal occurs 6.2 microseconds after the end servo burst. It is used to tell the servo demodulation circuits that the servo sector is done and the servo circuits can be reset. A point 538 receives an inverted right gate signal (WRITGATI) from point 416 and is used in the circuits of FIG. 8. A point 540 receives a crystal frequency signal from point 422 and is known as a delay field signal (DELAYF2D) which is used in the circuits of FIG. 6. A point 542 receives an inverted crystal frequency signal from point 422 and is known as XF2B and is used in the circuits of FIG. 6. A point 544 and a point 546 are used as test points.

FIG. 6 shows a circuit diagram of part of the servo decoder 228 and is designated by the general reference number 600. Part 600 contains parts of the demodulator clock generator 306, and sync detect 302. A point 610 receives a BSP1 signal from the demodulator clock generator of FIG. 7. BSP1 is the "B" servo burst sample window. The trailing edge of the window clocks a latch 612. The output of latch 612 and the gap detect signal from point 428 are gated at a gate 614 and the resulting signal clocks a latch 616. The output of latch 616 is then sent to a point 618. The signal at point 618 is the end servo burst (ENDSVO) which indicates that the end of a servo sector has been reached. Latch 616 has an output 620 which is gated with the XF2B signal from point 542 and the BUFFNABL signal from point 414 and is then used to reset latch 616.

The slight delay in the reset of latch 616 causes the end servo burst at point 618 to be a short burst. The XF2B signal at point 542 is the inverted crystal frequency from FIG. 5 and the BUFFNABL signal at point 414 is the signal from the controller 220 which is used to disable the decoder 228.

A shift register 628 is comprised of a plurality of latches 630, 632, 634, 636, 638 and 640. The clock gate signal from point 484 and the gap detect signal from point 428 are gated and provide the clocking for latch 630. Latch 630 detects any gaps between pulses and if a gap is detected, it clears the rest of register 628. Latch 630 is enabled only when the clock gate signal is on, which is when the alternate sync section 70 is being read.

Latch 632 detects one pulse from the gated servo data from point 420. Latch 634 detects two pulses, latch 636 detects three pulses, latch 638 detects four pulses, and latch 640 detects five pulses. The latch 630 does not look for a gap during the sync section 56. This is because the sync detect will detect a sync mark even if only three of the four pulses of the sync mark are detected. If three or four pulses are detected, a signal is sent to enable a latch 642. If five pulses are detected, then latch 642 is not enabled.

Latch 642 is clocked by the gap detect signal from point 428. Latch 642 then clocks a latch 644 which enables a decade counter 646 and resets a latch 648 and a latch 650. The latches 648 and 650 count the carrys out of decade counter 646. Decade counter 646 divides the crystal frequency from point 540 by ten so that latch 648 counts ten timing pulses and latch 650 counts twenty pulses. Latch 650 then sends a syncs signal to a point 456 of FIG. 5. Latch 650 also resets latch 644.

If two pulses are detected by shift register 628, then a signal is sent to enable a latch 654. Latch 654 is reset by a gated sync gate signal from point 484 and the short "T2" signal from point 472. Latch 654 is clocked by the gap detect signal from point 428. Latch 654 then clocks a latch 656 which in turn clocks a latch 658. Latch 658 enables a decade counter 660. Counter 660 clocks a latch 662. Latch 662 provides a two timing pulse delay and then sends a syncs signal to point 456. The twenty timing pulse delay of latch 650 and the two pulse delay of latch 662 insure that the syncs signal resulting from detection of a sync mark arrives at point 456 at approximately the same time as the syncs signal resulting from detection of an alternate sync mark.

A point 668 receives a "T4" signal from the demodulator clock generator 306 of FIG. 7. "T4" is the timing window for the code beat section 78. A point 670 receives a "T6" signal from the demodulator clock generator 306 of FIG. 7. "T6" is the timing window which indicates the beginning of the second section 82 of the code beat section 78. A point 672 receives an HSVODA signal from digitizer 226. HSVODA signal is the digitized signal from the transducer head.

Signal "T4" resets a latch 674, a latch 676, a latch 678 and a latch 680. Latch 674 receives clocking from point 672. The latch 674 divides the signal by two. Latch 674 clocks latch 676 and latch 678. Latch 676 detects two pulses and latch 678 detects four pulses from the servo data being read.

A latch 680 is enabled if two pulses are detected after the "T4" window begins, but before the "T6" window begins. Latch 680 enables a latch 682. Latch 682 puts out an odd track signal to a point 684. The odd track signal indicates that two pulses have been detected in either subsection 80 or subsection 82 of the code beat section 78 and so the track is an odd numbered track.

A latch 686 is enabled if four pulses have been detected by latch 678 and latch 680 is not outputting its signal. The latch 686 puts out an even track signal to a point 690. The even track signal indicates that zero and four pulses have been detected in either subsection 80 or subsection 82 of the code beat section 78 which indicates that this is an even numbered track.

FIG. 7 shows a circuit diagram of part of the servo decoder 228 and is designated by the general reference number 700. Part 700 contains parts of the demodulator clock generator 306. The SIGK signal from point 423 of FIG. 5 is the crystal frequency and is passed to a point 708 and is known as a BUFF2B signal. The BUFF2B signal clocks a decade counter 710. A shift register 712 is comprised of a plurality of latches 714, 716, 718, 720, 722, 724, 726, 728, 730, 732 and 734. The shift register 712 is enabled after twenty-four timing counts of the crystal frequency.

A latch 740 is connected to point 462 from FIG. 5. The SVOFLBGA signal is used to start the demodulator clock generator 306 and indicates that the syncs and alternate sync marks have been detected. The SVOFLBGA signal clocks latch 740 and the "T4" signal is output at point 668. Once the shift register 712 is enabled, the latches begin to count. Latch 714 represents thirty timing pulses, latch 716 forty timing pulses, etc. Latch 732 represents one hundred and twenty timing pulses. When latch 732 is enabled, it clocks latch 734. Latch 734 then enables a latch 742 and a latch 744. Latch 744 is clocked by the crystal frequency signal from point 423 and is active after one hundred and twenty-one timing pulses. Latch 732 resets register 712 so it can run through a second cycle. On the second cycle, latch 742 is clocked after one hundred and eighty timing pulses.

A latch 746 is clocked after fifty timing pulses of shift register 712. Latch 746 resets latch 740 and shuts off the T4 signal at point 668. A latch 750 is clocked by counter 710. Latch 750 enables a latch 752. Latch 752 clocks a latch 754. Latches 750 and 752 form a twenty-four timing pulse delay circuit. Latch 754 enables the shift register 712 after the twenty-four timing pulse delay. A latch 756 is enabled by latch 752. Latch 756 outputs a "T6" signal to point 670.

Latch 746 is clocked after fifty timing pulses. The output forms the leading edge of the burst gate window (BURSGI) and is sent to a point 760. A latch 762 is clocked by shift register 712 at one hundred and ten timing pulses. The inverted output of latch 762 is sent to AND gate 764 and shuts off the burst gate signal at point 760. When latch 744 is enabled after one hundred and twenty timing pulses, a signal is sent to point 760. This signal represents the leading edge of the second window of the burst gate. After one hundred and eighty counts, latch 742 outputs a XENDSVFI signal to point 530. The XENDSVFI signal indicates the end of a servo sector and resets the servo decoder circuits. It also causes an end to the second window of the servo burst.

A latch 770 and a latch 772 are connected to latch 742. Latch 770 and 772 form a delay circuit to insure that the XENDSVFI signal is long enough. A latch 774 is clocked by shift register 712 after forty timing pulses. Latch 774 sends a "T5" signal to a point 776. Signal "T5" is used by the circuits of FIG. 6.

A point 780 receives an enable signal from controller 220. The enable signal enables the decoder 228. A plurality of points 782 receives signals for the optional head switching feature. A plurality of points 784 provides output signals for the head switching feature. A point 786 receives a ZF2D signal from point 423.

Figure 8B:
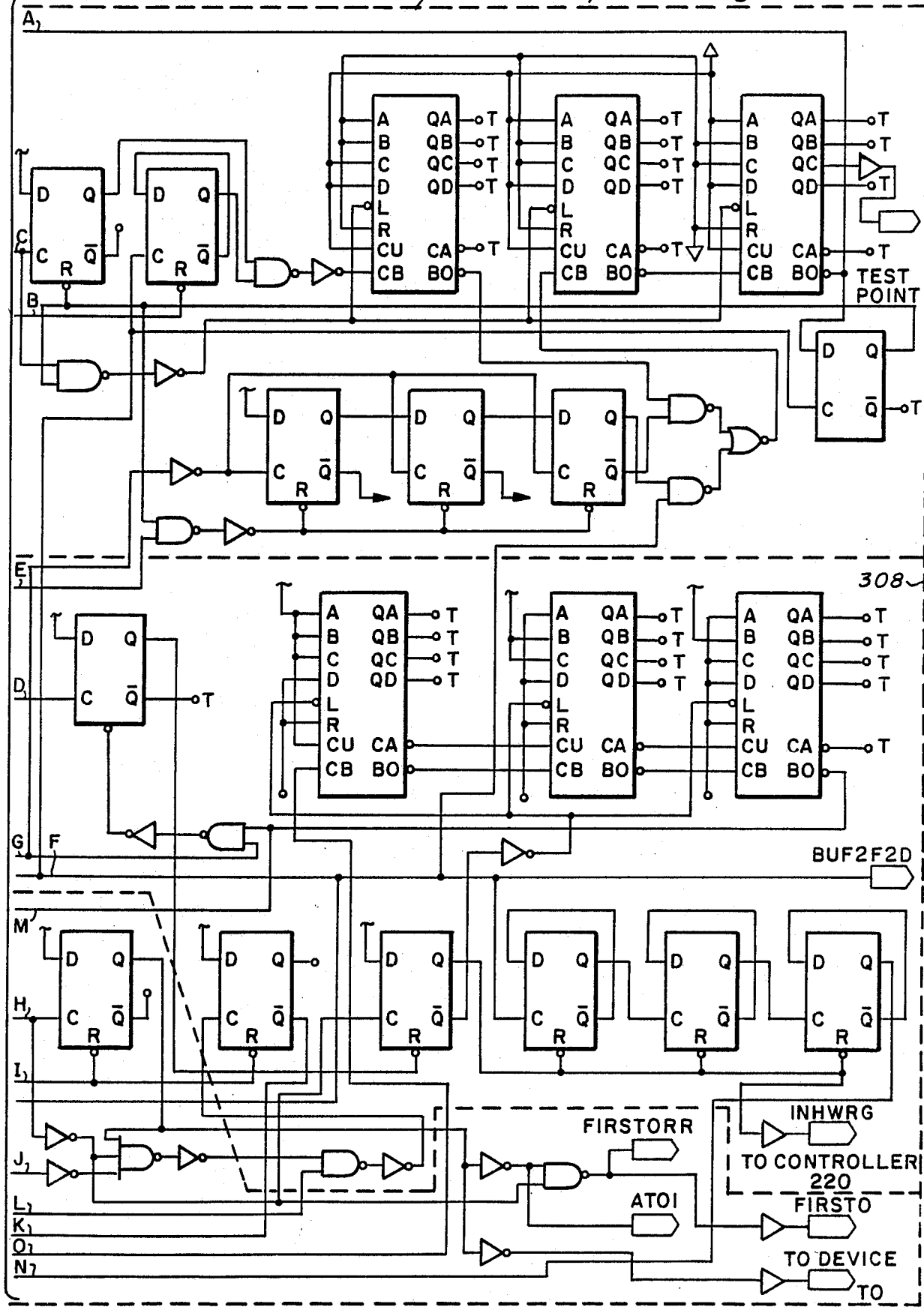

FIG. 8, comprised of sheets FIG. 8A and 8B, shows a circuit diagram of part of the servo decoder 228 and is designated by the general reference number 800. Part 800 also shows parts of the controller signal generator 308. An end servo burst signal from point 618 clocks a latch 810. Latch 810 enables a decade counter 820. Decade 820 clocks a latch 822. Latch 822 clocks a latch 824. Latch 824 clocks a latch 826. Latch 826 sends a signal to a point 828 and a point 830. Point 828 receives a first FIRSTORR signal, which is a signal generated after the end servo burst signal which is used by the circuits of FIG. 6. Point 830 receives a FIRSTO signal which is used by device 230 to reset itself. Latch 826 clocks latch 832. Latch 832 resets latch 810.

Latch 824 clocks a latch 836. Latch 836 enables a counter 838, 840 and 842. Latch 836 also resets a latch 844, a latch 846 and a latch 848. Latch 836 outputs an INHWRG signal to a point 850. The INHWRG signal goes to controller 220 and indicates that the servo sector is passed and the data sector can be written upon. Counter 838, 840 and 842 count a time equivalent to the time required for the data sector to end and the next servo sector to begin. Counter 842 then resets latch 852. Latch 852 then resets latch 836 and the INHWRG signal is stopped. A latch 856 and a latch 858 provide speed testing of counters 838, 840 and 842. The rest of the circuits of FIG. 8 relate to the optional head switching feature.

FIG. 9, comprised of sheets 9A and 9B, shows a circuit diagram of part of the servo decoder 228 and is designated by the general reference number 900. FIG. 9 primarily concerns the head switching features. However, a small part deals with the detection of the index sector. When an index sector is detected, the X2INDEX signal is generated in the circuits of FIG. 5. The X2INDEX signal sets a latch 910. The ATO1 signal from FIG. 8 provides clocking for latch 910. Latch clocking for latch 910. Latch 910 outputs an INDEX signal at a point 912. The INDEX signal goes to controller 220.

Figure 13:
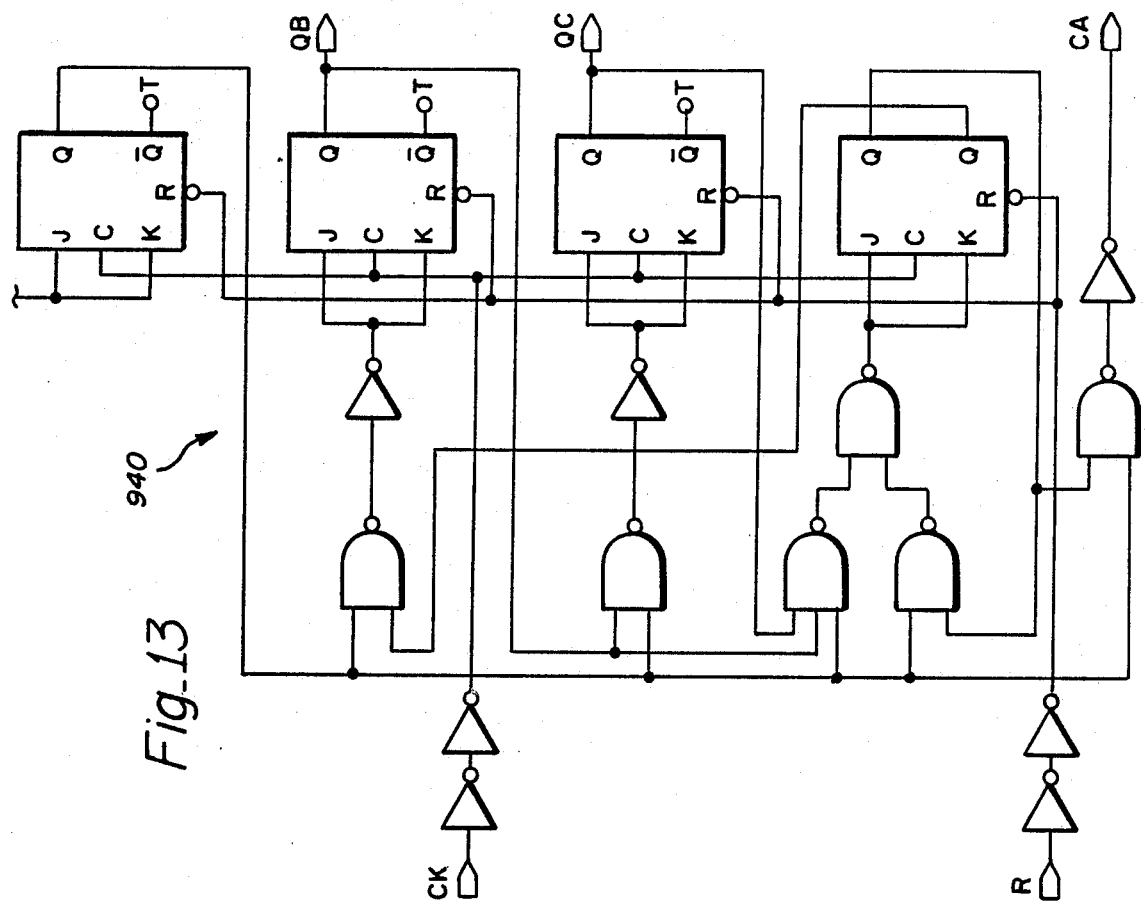
FIG. 13 is a circuit diagram of part of the servo decoder of FIG. 4.
Figure 12:
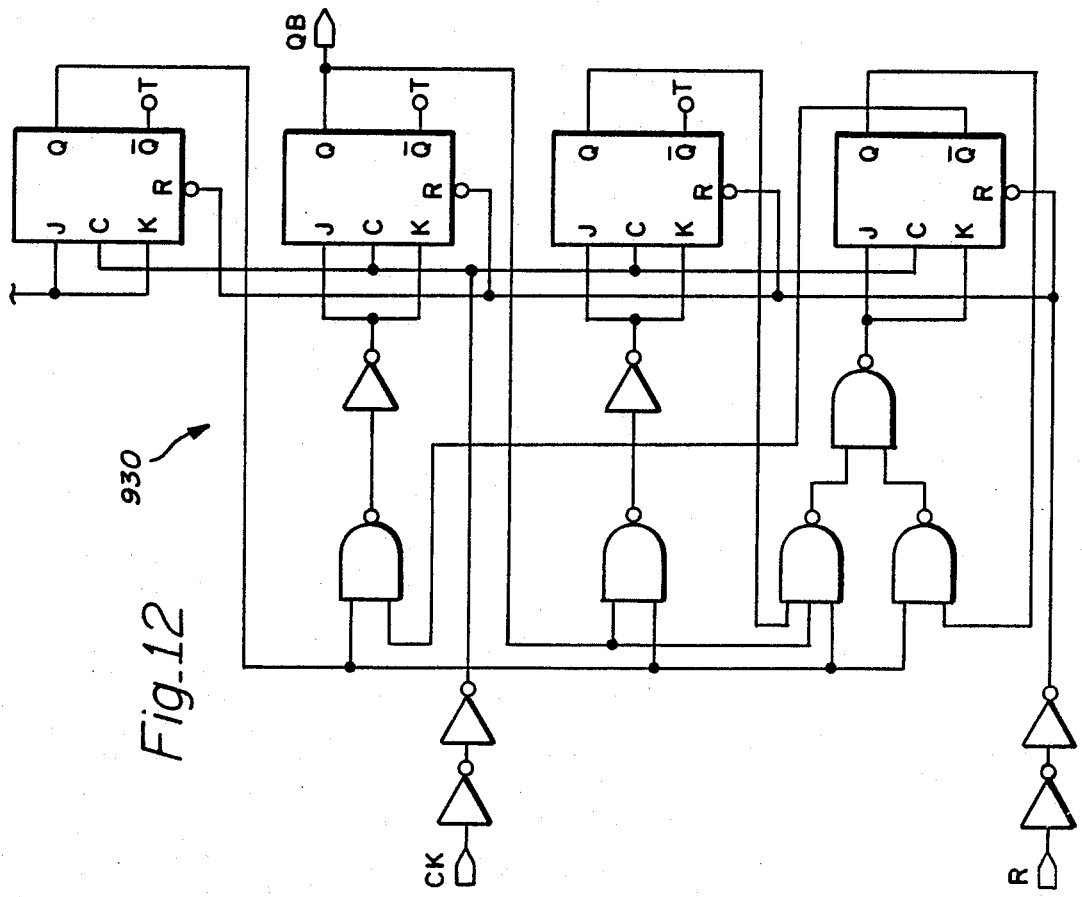
FIG. 12 is a circuit diagram of part of the servo decoder of FIG. 4.

FIG. 10 is the circuit diagram of the decade counter 424 of FIG. 5, FIG. 11 is the circuit diagram of the decade counter 480 of FIG. 5, FIG. 12 is the circuit diagram of the decade counter 660 of FIG. 6, FIG. 13 is the circuit diagram of the counter 710 of FIG. 7, and FIG. 14 is the circuit diagram of decade counter 646 of FIG. 6 and counter 820 of FIG. 8. The components of FIGS. 10–14 are all illustrated by their commonly recognized figures.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A magnetic disk comprising:
   data sectors and servo sectors alternating on the surface of the disk, said data sectors and servo sectors each having a plurality of data tracks and servo tracks respectively, said servo tracks offset radially midway between said data tracks, each servo track being comprised of a gap section, a synchronization section following said gap section, and a burst section following said synchronization section, said servo tracks alternating between having a first synchronization mark and a second synchronization mark, said first synchronization mark is located in a first portion of said synchronization section and said second synchronization mark is located in a second portion of said synchronization section, said first synchronization marks are not radially aligned with said second synchronization marks, said servo tracks alternating between having a first servo burst and a second servo burst, said first servo burst is located in a first portion of said burst section and said second servo burst is located in a second portion of said burst section, said first servo bursts are not radially aligned with said second servo bursts, said second synchronization mark being distinguishable from said first synchronization mark such that a transducer head of a disk drive following the path of a data track will be able to read both said first synchronization mark and said second synchronization mark and the disk drive will be able to generate timing signals independently from either one of said first synchronization marks or one of said second synchronization marks for reading said first servo bursts and said second servo bursts in said burst section.

2. The magnetic disk of claim 1 wherein,
   said first synchronization mark has four magnetic pulses and said second synchronization mark has two magnetic pulses such that a disk drive will generate a first set of timing signals for reading said burst section if four pulses are detected and will generate a second set of timing signals for reading said burst section if two pulses are detected, thereby allowing said burst section to be read if either said first synchronization mark or said second synchronization mark is detected.

3. A method of servo synchronization for a magnetic disk drive system comprising the steps of:
   defining servo and data sectors on a magnetic disk;
   defining servo tracks and data tracks in said servo and said data sectors respectively, said servo tracks offset radially midway between said data tracks;
   defining a gap section, a synchronization section following said gap section, and a burst section following said synchronization section, within each servo track;
   defining a first portion and a second portion of said synchronization section;
   alternately encoding consecutive of said servo tracks with a first synchronization mark in said first portion of said synchronization section and a second synchronization mark in said second portion of said synchronization section such that said first synchronization marks are not radially aligned with said second synchronization marks, said servo tracks which are consecutive alternate between having a first synchronization mark and a second synchronization mark, said first synchronization mark is distinguishable from said second synchronization mark;
   defining a first portion and a second portion of said burst section;
   alternately encoding consecutive of said servo tracks with a first servo burst in said first portion of said burst section and a second servo burst in said second portion of said burst section, said first servo bursts are not radially aligned with said second servo bursts, said servo tracks which are consecutive alternate between having a first servo burst and a second servo burst;
   reading said servo tracks with a transducer head and generating a first set of timing signals responsive to the detection of one of said first synchronization marks and generating a second set of timing signals responsive to one of said second synchronization marks, thereby allowing said burst section to be read if either said first synchronization mark or said second synchronization mark is detected.

4. The method of claim 3 wherein, said first synchronization mark has four magnetic pulses and said second synchronization mark has two magnetic pulses.

* * * * *